May 9, 1933.  L. T. RHOADES  1,908,052
CONDENSER TESTER
Filed Feb. 12, 1931
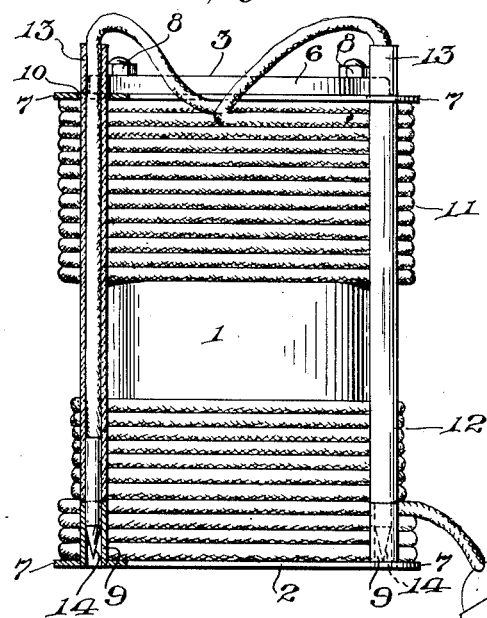
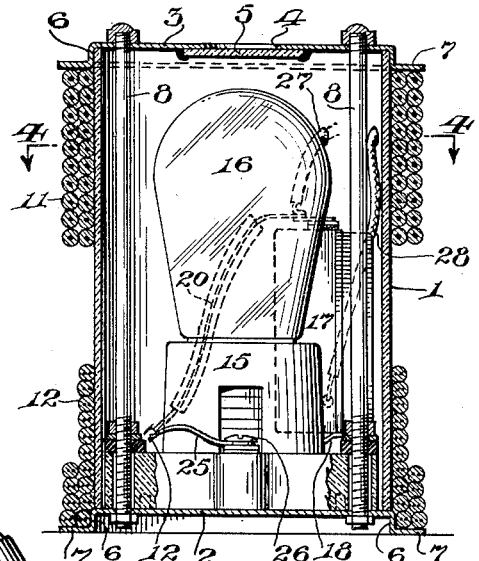
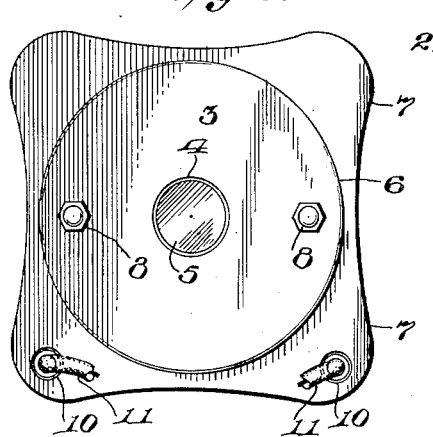
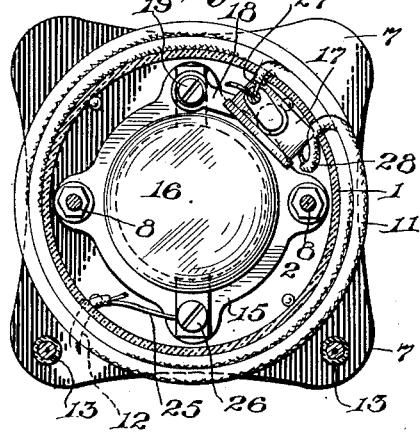
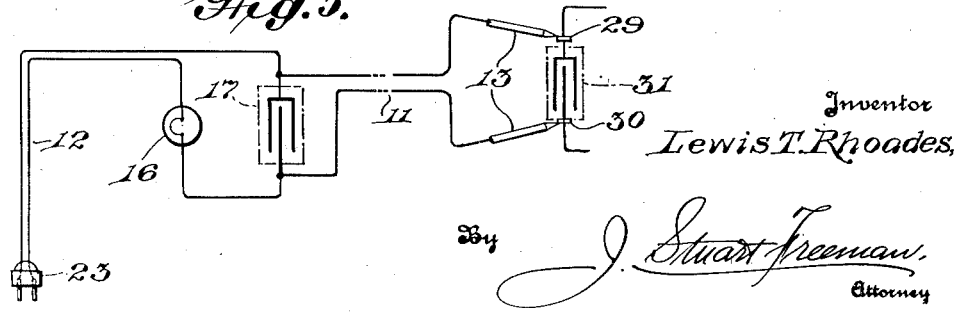
Inventor
Lewis T. Rhoades,
By J. Stuart Freeman.
Attorney Patented May 9, 1933

1,908,052

UNITED STATES PATENT OFFICE

LEWIS T. RHOADES, OF MONT CLARE, PENNSYLVANIA

CONDENSER TESTER

Application filed February 12, 1931. Serial No. 515,173.

The object of the invention is to broadly provide improvements in condenser testers, and more specifically in instruments for testing condensers of the types used in the ignition systems of the internal combustion engines employed in aeronautical, automotive, marine and various commercial equipment.

Condensers of this general class, like all others, fail from two principal causes, namely, either the dielectric between oppositely charged "plates" becomes punctured or otherwise so ruptured as to produce what is technically known as a short circuit, or an internal breaking of the electric connections as a result of engine vibration, or the like, produces what is known as an open circuit.

When such failure occurs from either of these causes, the ignition system ceases to function and the engine consequently becomes temporarily useless. Then, when the repairman seeks to locate the immediate cause of the breakdown in order to repair the same, he is met with the difficulty of isolating the element of the system which has failed. He must dismantle or at least disconnect each element, such as the coil, distributor, contacts, condensers, etc., until by a cut-and-try process of elimination he has finally located the failure as within a particular condenser.

Now, it is a well-known fact that even when a condenser is in perfect condition, none of the available electric equipment or current in the average service station is adapted for or capable of differentiating between such perfect condenser and other condensers having "short" or "open" circuit conditions. Direct current, regardless of its voltage, is wholly incapable of indicating either of the three conditions mentioned, and alternating current is adequate only if within certain voltage ranges above that of the ordinary commercial lighting circuit, so that at present the only available testers comprise motor-generator sets, meters of several types and other apparatus, a very costly set of equipment.

An object of the invention therefore is to provide an instrument which is rugged in construction, which requires no motor, generator, or meter, as an accessory, which operates off of the usual alternating current lighting circuit, which can be sold at a profit for but a small fraction of the cost of present-day testing devices for this purpose, which permits the direct testing of a given condenser without requiring that it be disconnected or removed from the ignition system of which it forms a part, which is direct reading both in daylight and dark, which in no way affects or disturbs other parts of the system, which is positive in differentiating perfect condensers from both open and short circuited conditions, which does not endanger the dielectric of a condenser while it is being tested, which is small enough to be carried in the usual tool box, and which can be equally well operated by a novice.

Another object is to provide an instrument which takes advantage of the law or fact that alternating current will pass through a condenser in direct proportion to the voltage of the current and the capacity of the condenser. However, the capacity of condensers used in commercial ignition systems of the types above mentioned is insufficient to permit the passage of enough current to visibly illumine even the smallest electric bulb or lamp obtainable on the market, regardless of the voltage applied, and by "visibly illumine" is meant the heating of the filament in a lamp to a degree which can be visibly detected by a change in color.

A further and more specific object is therefore to provide in the improved device a condenser of such capacity that when it is connected in multiple or parallel with the condenser to be tested, if the latter is in perfect condition, sufficient current will pass through the lamp of the device to cause the filament to glow to a visible brightness. This brightness may be and is preferably considerably below the rated candlepower of the lamp being used in the tester, but is sufficient to be clearly visible not only in the dark but also in sunshine when viewed through an aperture in the casing within which the lamp is housed.

In a device of this character, if the condenser is short circuited in any manner, upon applying current to the lamp the filament will glow to its rated brilliancy, but when on the other hand an open circuit is present the filament fails to glow at all and accordingly remains totally dark. A still further object therefore is to so proportion or balance the ratio of the capacity of the tester condenser with that of the average condenser used in the ignition systems of internal combustion engines, that when alternating current of a commercial voltage, such as 110 volts, is applied to the lamp of the tester in series with the tester and tested condensers connected in multiple, the filament of the lamp will glow sufficiently to be clearly visible but in intensity well below the normal rated candlepower of the lamp, thus permitting unquestionable and instant detection of the relative perfect and short circuit conditions of the condenser being tested. Of course, the test condenser alone passes a certain amount of current, but an amount which is wholly insufficient to raise the temperature of the test lamp's filament to a visible glow.

With the objects and principle of operation of the invention thus broadly stated, the invention comprises in its commercial embodiment further details of construction and operation which are fully brought out in the following description, when read in conjunction with the accompanying drawing, in which Fig. 1 is an elevational view of one embodiment of the invention, partly in section; Fig. 2 is a vertical diametrical section of the same; Fig. 3 is a top plan view of the device; Fig. 4 is a horizontal section on the line 4—4 of Fig. 2; and Fig. 5 is a diagrammatic view of the wiring of the improved tester in operative association with a condenser being tested.

Referring to the drawing, the preferred embodiment of the invention comprises an enlarged tubular casing 1, preferably formed of vulcanized fibre or other insulating material, the ends of said casing being closed by preferably metallic base and top plates 2 and 3 respectively, the latter of which is provided with an opening 4, spanned by a transparent closure 5, held in position in any suitable manner. Each of said casing end closures in addition to its central portion preferably comprises a cylindrical flange portion 6, adapted to receive, encircle, and thereby protect the adjacent edge portion of the casing member 1, and terminating in radially extending ears 7.

Said end members may be maintained in operative binding relation with the ends of the cylindrical casing by means of elongated bolts or the like 8, and two of the ears 7 of the base closure member 2 are provided with tubular cups 9, while the corresponding ears of the opposite casing closure member 3 are provided with apertures 10. The casing 1 in addition to inclosing a portion of the mechanism of the instrument, also serves as a reel for two pairs of flexible leads 11 and 12. The external end portions of the leads 11 preferably extend through tubular insulating handles 13 and are preferably secured to pointed metallic terminals 14 which form the closures for the free end portions of said handles and when not in use are adapted to be positioned within the cupped receptacles 9 after said handles have been inserted through the apertures 10 in alignment with said receptacles.

Within said casing and secured by the bolts 8 or any other suitable means to the base casing closure member 2 is a lamp receptacle 15, adapted to operatively support a standard incandescent bulb or lamp 16 of preferably low wattage consumption. Also mounted upon the receptacle 15 in any suitable manner is a fixed condenser 17, one terminal of which is connected through a metallic member 18 with one of the terminals 19 of said receptacle, while the opposite terminal of said condenser is connected through one of the wires 20 in the cable 12 to one of the terminals 22 of the connector plug 23, the said terminal 24 of said plug being connected through the other wire 25 in said cable with the opposite terminal 26 of said receptacle. Thus when the plug 23 is attached to any suitable receptacle energized by a commercial alternating current of average voltage, such as 110 volts, a small quantity of the alternating current will pass the condenser 17 and flow through the filament of the lamp 16, but this quantity is so slight as to be unable to raise the temperature of such filament to visible luminosity.

The terminals of the condenser 17 are additionally connected through leads 27 and 28 to the terminals 14, as hereinbefore described, through the handles 13. With this construction after the plug has been connected with an electrically energized socket, as above referred to, the handles 13 may be withdrawn from their inactive position shown in Fig. 1 of the drawing and brought into contact with the opposite terminals 29 and 30 of any condenser 31 to be tested. Purely for the purpose of illustrating the operation of this device, it is assumed that the lamp 16 is of ten watt rating for a 110 alternating current. Then if the condenser 31 is of approximately .25 microfarad capacity and the condenser 17 is of approximately .315 microfarad capacity, the two condensers being connected in multiple or parallel relation as shown in Fig. 5 of the drawing will pass sufficient electric current to raise the temperature of the lamp filament sufficiently to make it visibly glow when viewed through the transparency 5 which closes the aperture 4 in the casing portion of the device.

However, as hereinbefore pointed out, it is to be understood that the condenser capacities mentioned are purely illustrative and that the brightness of the lamp when glowing during the testing of the condenser 31 when in perfect condition is considerably less intense than if said last-named condenser is short-circuited, in which latter case the full current passes through the lamp and causes it to illumine to its full rated candlepower. On the other hand, it is conversely evident that if the tested condenser 31 is open-circuited, it will pass no current to supplement the small amount being passed by the tester condenser 17, which as hereinbefore stated is insufficient to cause the lamp filament to visibly glow.

While the drawing illustrates one embodiment of the invention, it is to be understood that the invention is by no means limited to this exact structure, but is intended to include all devices which may operate upon the inherent principle hereinbefore brought out, this principle briefly being that the tester condenser is of such low capacity that being in series with the lamp it will not pass sufficient alternating current to permit the lamp filament to glow visibly, but that said tester condenser when connected in multiple with a condenser being tested will together with the last-named condenser pass sufficient current to permit the lamp to glow preferably to a degree less than its normal rated candlepower, in order that when the lamp glows to substantially its rated candlepower it will indicate that the condenser being tested is short-circuited, and conversely that if the lamp fails to glow the indication will be that the condenser being tested is open-circuited.

Having thus described my invention, what I claim and desire to protect by Letters Patent of the United States is:—

1. A condenser tester, comprising a hollow casing, closures for the ends of said casing, one of said closures having an aperture, an incandescent lamp within said casing, a condenser also within said casing, means to electrically connect said condenser and lamp in series, leads extending from within said casing to connect said condenser and lamp to a source of alternating current, and leads also extending from within said casing to connect said condenser in multiple with a second condenser to be tested, whereby if the second condenser is functioning the dull glow of the lamp may be seen through said aperture, and if the second condenser is short-circuited the brilliantly illumined lamp may be seen in the same manner.

2. A condenser tester, comprising a hollow cylindrical casing adapted to form a reel, closures for the ends of said casing having radial extensions to form longitudinal limits for said reel and one of said closures having an aperture, an incandescent lamp within said casing, a condenser also within said casing, means to electrically connect said condenser and lamp in series, leads extending from within said casing to connect said condenser and lamp to a source of alternating current, leads also extending from within said casing to connect said condenser in multiple with a second condenser to be tested, the two sets of leads adapted to be wound upon said casing reel when not in use.

3. A condenser tester, comprising a hollow cylindrical casing adapted to form a reel, closures for the ends of said casing having radial extensions to form longitudinal limits for said reel and one of said closures having an aperture, an incandescent lamp within said casing, a condenser also within said casing, means to electrically connect said condenser and lamp in series, leads extending from within said casing to connect said condenser and lamp to a source of alternating current, leads also extending from within said casing to connect said condenser in multiple with a second condenser to be tested, the two sets of leads adapted to be wound upon said casing reel when not in use, tubes of insulation material surrounding the end portions of said last-mentioned leads to form handles, metallic terminals forming closures for the free ends of said tubes and connected to said last-mentioned leads.

4. A condenser tester, comprising a hollow cylindrical casing adapted to form a reel, closures for the ends of said casing having radial extensions to form longitudinal limits for said reel and one of said closures having an aperture, an incandescent lamp within said casing, a condenser also within said casing, means to electrically connect said condenser and lamp in series, leads extending from within said casing to connect said condenser and lamp to a source of alternating current, leads also extending from within said casing to connect said condenser in multiple with a second condenser to be tested, the two sets of leads adapted to be wound upon said casing reel when not in use, tubes of insulation material surrounding the end portions of said last-mentioned leads to form handles, metallic terminals forming closures for the free ends of said tubes and connected to said last-mentioned leads, the inner surface of one of said closures being provided with receptacles, and the other closure being provided with apertures through which said lead handles extend when said terminals rest in said receptacles when not in use.

5. A condenser tester, comprising a hollow cylindrical casing adapted to form a reel, closures for the ends of said casing having radial extensions to form longitudinal limits for said reel and one of said closures having an aperture, an incandescent lamp within said casing, a condenser also within said casing, means to electrically connect said condenser and lamp in series, leads extending from within said casing to connect said condenser and lamp to a source of alternating current, leads also extending from within said casing to connect said condenser in multiple with a second condenser to be tested, whereby if the second condenser is functioning the dull glow of the lamp may be seen through said aperture, and if the second condenser is short-circuited the brilliantly illuminated lamp may be seen in the same manner, the two sets of leads adapted to be wound upon said casing reel when not in use.

In testimony whereof I have affixed my signature.

LEWIS T. RHOADES.